Oct. 28, 1952

U. CORBINO 2,616,070

DEVICE FOR THE POLYPHASE TRANSFORMATION OF THE FREQUENCY OF THREE-PHASE CIRCUITS

Filed Dec. 8, 1949

3 Sheets-Sheet 1

INVENTOR
UGO CORBINO
BY Bertram Ottinger
ATTORNEY

Oct. 28, 1952 U. CORBINO 2,616,070

DEVICE FOR THE POLYPHASE TRANSFORMATION OF THE FREQUENCY OF THREE-PHASE CIRCUITS

Filed Dec. 8, 1949 3 Sheets-Sheet 2

INVENTOR
Ugo Corbino
BY Bertram Ottinger
ATTORNEY

Oct. 28, 1952 U. CORBINO 2,616,070

DEVICE FOR THE POLYPHASE TRANSFORMATION OF THE FREQUENCY OF THREE-PHASE CIRCUITS

Filed Dec. 8, 1949 3 Sheets-Sheet 3

Inventor

UGO CORBINO

By Bertram Ottinger

Attorney

Patented Oct. 28, 1952

2,616,070

UNITED STATES PATENT OFFICE 2,616,070

DEVICE FOR THE POLYPHASE TRANSFORMATION OF THE FREQUENCY OF THREE-PHASE CIRCUITS

Ugo Corbino, Rome, Italy

Application December 8, 1949, Serial No. 131,794
In Italy December 16, 1948

10 Claims. (Cl. 321—7)

The present invention concerns a method, and the corresponding devices, for the transformation of the frequency of alternating currents from an odd-numbered polyphase system to an even-numbered polyphase system whose frequency is a multiple of the fundamental frequency.

This object is attained by employing a phenomenon which is well known but has never, so far, been correctly interpreted, and that is the production of a third harmonic voltage in a symmetrical yoke three-phase magnetic core, transformer, or also in three single-phase cores fed two by two from the phases of a three-phase system, as a result of the variability of the reluctance of magnetic circuits consequent on the lack of symmetry of the system.

Things have to be arranged, naturally, so that from each of the several cores whose primary circuits are fed in series, according to appropriate diagrams, one of each of the single-phase secondary voltages can be obtained. Said voltages, being out of phase between each other by the required amount, form, as a whole, the new polyphase (even number of phases) system with multiple frequency.

For example, one can, in this manner, statically transform a three-phase system having a frequency *"n"* with the greatest ease and with a very high efficiency into a four-phase system having a frequency *"3n."*

In the attached drawings, which serve to illustrate schematically the method of operation and the structure of the transformers of frequency of polyphase currents, according to the present invention:

Figure 8:
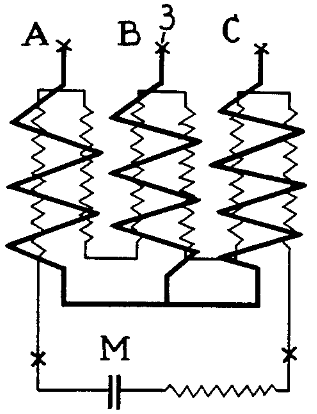

Fig. 8 indicates the diagram of the circuits on a core.

Figure 9:
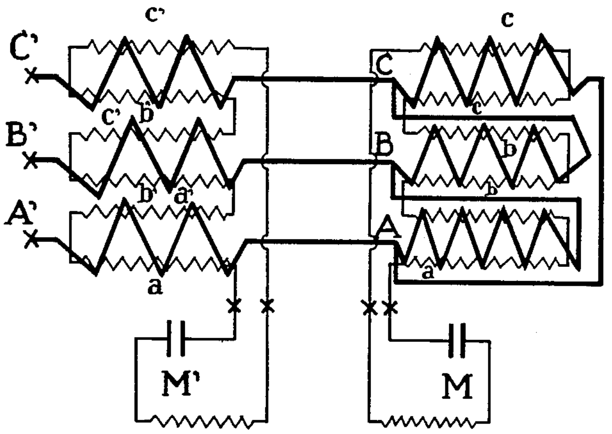

Fig. 9 indicates the diagram of connections for the transformation of a three-phase system with a frequency *"n"* into a four-phase system with a frequency *"3n."*

Figure 10:
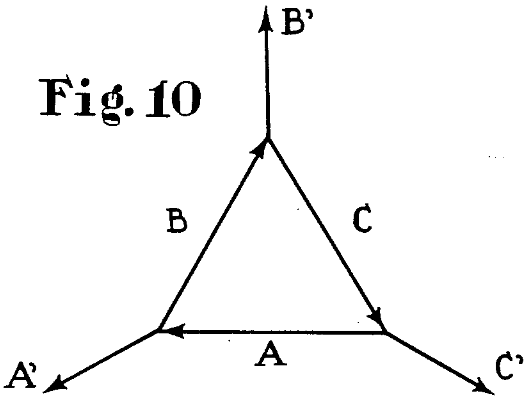

Fig. 10 is the diagram of connections of "open star-delta" circuits shown in Fig. 9.

Figure 11:
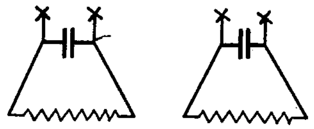

Fig. 11 shows one of the ways of arranging capacities on the secondaries.

Figure 12:
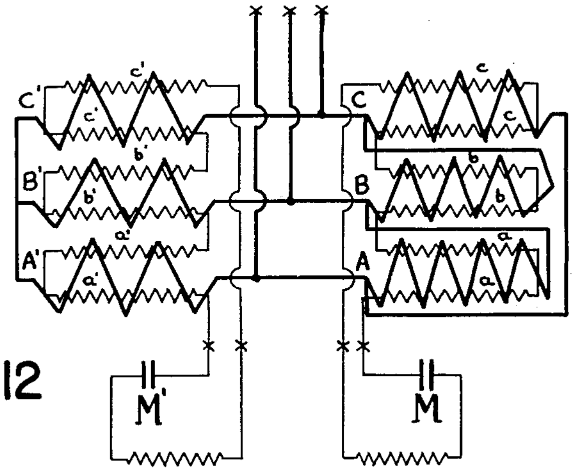

Fig. 12 is a view similar to Fig. 9, but showing an alternative electric circuit.

Figure 13B:
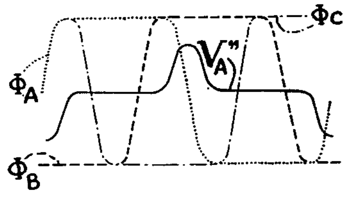
Figure 13A:
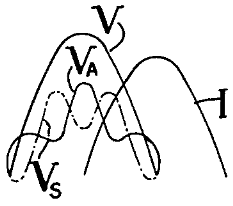

Figs. 13*a*, *b* and *c* are graphs of the voltage, current and flux waves in two three-phase sets whose primaries are connected in open-star delta as in Fig. 9.

Figure 14A:
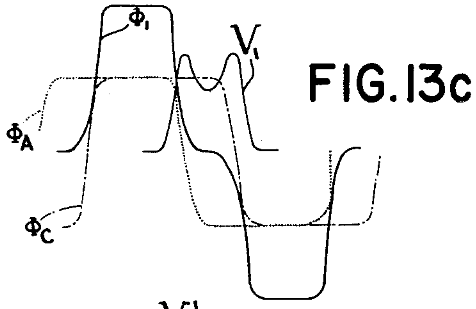

Figs. 14*a*, *b* and *c* are graphs of the voltage, current and flux waves in a single three-phase set whose primaries are star connected as in Fig. 8.

As will be noted, the figures in the drawings all refer to various parts of an installation, and therefore to a complete installation in which the odd-numbered polyphase system, whose frequency is to be multiplied, is a three-phase system with frequency *"n"* which is to be transformed into a four-phase system with frequency *"3n."*

The various parts of said installation will be successively described hereafter, and that is, the magnetic core of the frequency transformer, the primary and secondary windings of the same, and then the diagram and general arrangement of the said installation.

The magnetic core, from whose variable reluctance it is desired to profit, is obtained by separating a symmetrical-yoke three-phase core into its three single-phase elements. These can be obtained by separating each column into two semi-columns side by side. Continuity of the iron along each single-phase frame is indispensable, particularly in small transformers, since the joints at which a normal three-phase magnetic core divides have a fundamental importance in producing the phenomenon of variable reluctance. For this reason, such joints may be considered admissible only in apparatus having notable dimensions, and in such case it is necessary to verify the identity of the reluctances in each of the single-phase frames. It is consequently apparent that in non-divisible cores the windings must be woven onto the core itself.

Figures 1, 2, 3, 4, 5, 6:
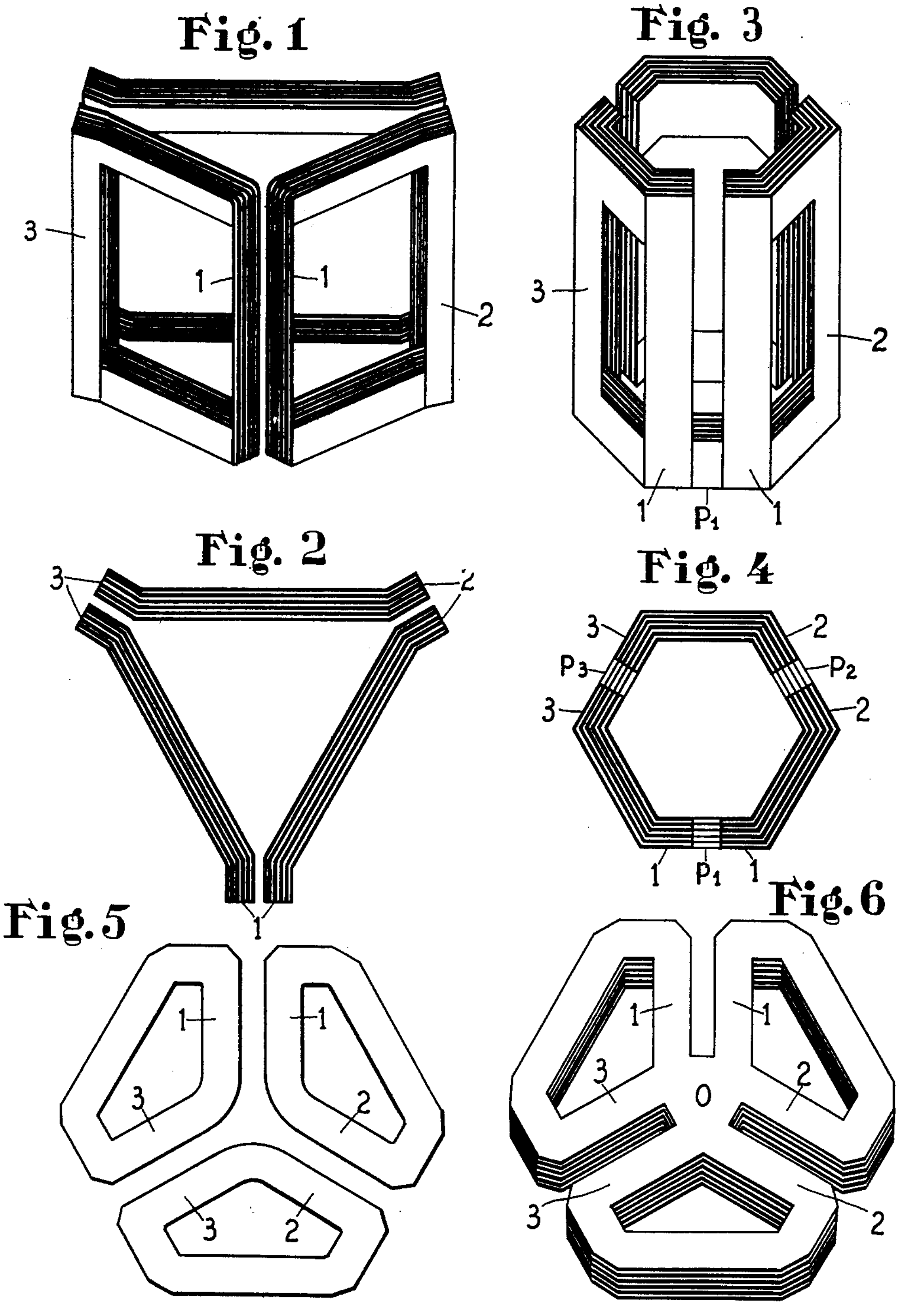
Figs. 1 and 2 show, respectively in perspective and in transverse section, the form and arrangement of laminations in one particular core with symmetrical yokes.
Figs. 3 and 4 show, also in perspective and in section, a similar form of construction which is, however, supplied with means to ensure continuity of the magnetic circuit at one of the two yoke levels.
Fig. 5 shows a grouping of three single-phase cores adapted for a particular type of winding.
Fig. 6 is a perspective view of another form of arrangement of a grouping of three cores in which the magnetic continuity of one of the two layers of yokes is established at the center of the figure.

From Figs. 1 and 2 it is easy to see the form of the frames composing the core, whose vertical elements 1—1, 2—2, 3—3 form the semi-columns of the three phases, as well as the type of lamination, and in Figs. 3 and 4 can also be seen the laminated "keepers" $P_1$, $P_2$, $P_3$, which serve to establish the continuity of the magnetic circuit down at the bottom of elements 1—1, 2—2, 3—3, the whole forming a first example of nuclei with symmetrical yokes.

Another arrangement of the core is that shown in Figs. 5 and 6 with a different form of lamination consisting of superimposed stampings as can be seen in Fig. 6, instead of stampings set side by side as in Figs. 1, 2, 3 and 4. In the arrangement shown in Fig. 6, magnetic continuity is established at the center "O" of the figure where the three packs of yokes meet.

Figure 7:
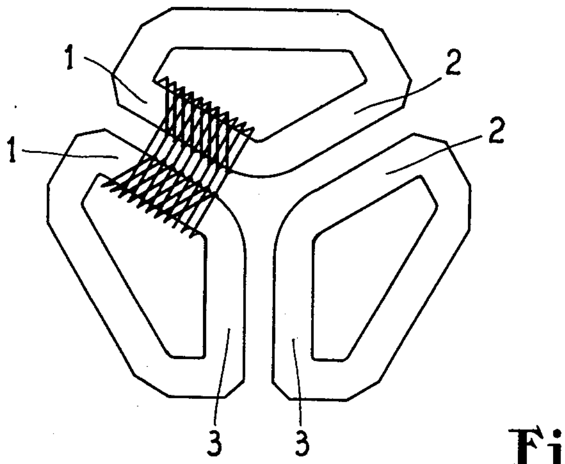
Fig. 7 shows the windings on a core of the type shown in Fig. 5 for one primary phase alone.

As far as the windings are concerned, the secondary windings are arranged in six columns on the six semi-columns 1—1, 2—2, 3—3 of the nucleus, and the turns are wound in an opposite sense of rotation on the two semi-columns facing each other in each primary phase, as can be seen in Fig. 7 which shows the windings for one of the phases. The six columns which together constitute the secondary, are connected in series as can be seen from Fig. 8, so that the three phases A, B and C of the primary winding are matched by three couples of windings *a*—*a*, *b*—*b*, *c*—*c*, of the secondary. The primary winding is a normal three-phase winding each phase of which, however, is wound on the two semi-columns, facing each other, which carry the two corresponding secondaries wound in an opposite sense to each other.

As a result, therefore, this arrangement of the secondary can be ideally considered as coinciding with a winding on the yokes which, profiting from the division of the core columns each into two semi-columns, has been made to "slide" along these so as to link itself better with the primary winding.

Suppose we now have another core arranged exactly as in the one described above, but differing from it in the fact that the primary three-phase winding A, B, C has a "delta" connection The two cores can be connected in the manner shown in Fig. 9, thus forming an installation for the static transformation of a three-phase system having a frequency "*n*" into a four-phase system having a frequency "3*n*."

As can be noted from Fig. 10, the two three-phase primaries are connected, the first as an "open star"—in other words a star with open neutral—whose three points feed the primary A, B, C of the second nucleus which is delta connected. This connection is to be preferred to a diagram (Fig. 12) in which the two primaries are fed in parallel (although this is also possible).

Due to the high reactance of the secondary circuits, it is necessary to insert suitable capacities M, M' in them, said capacities attenuating the voltage drop between no-load and load and, modifying the phase of the secondary current, improving the reaction between secondary and primary and thus determining the transformation effect. This capacity can be arranged in series in the secondary circuit, as shown in Figs. 8 and 9, or in parallel, as shown in Fig. 11. In this case however, due to the triple frequency resonance value, the current circulating under no-load conditions assumes very high values, as also does the flux; the variation in the secondary voltage between no-load and full-load operation therefore becomes very high, for which reason this arrangement should only be used under constant load conditions. It is also evident that the capacities can be inserted in the circuit some in series and some in parallel.

Rephasing on the primary side has not been considered here, but this might become necessary because of the low power factor of the device from the feed side.

The case described and illustrated, for transforming a three-phase system with frequency "*n*" into a four-phase system with frequency "3*n*" is, in practice, that which is of major interest. It should be noted however that while transformation into four-phase with balanced loads gives a primary absorption of practically sinusoidal current, transformation into single phase, utilizing only one core set, on the other hand, absorbs modulated and distorted currents. In the case of great power, this could lead to deleterious effects on the feed net-work.

THEORY OF FREQUENCY TRANSFORMATION

(1) *The basic principle*

All bibliography and references on frequency changers are founded:

(*a*) On saturation of magnetic cores, and consequent valve effect, to obtain harmonic and subharmonic secondary voltage;

(*b*) On super-imposition of permanent magnetic flux and alternating current flux.

For class (*a*) reference may be made to: F. Spinelli, U. S. L. P. No. 1,157,730, and H. M. Huge, U. S. L. P. No. 2,424,237.

For the second (*b*) to: H. J. McCreary, U. S. L. P. No. 2,234,634 and No. 2,445,857.

In the present invention harmonic voltage on secondary windings is obtained by normal variability of reluctance of the magnetic circuits. This is more properly called "nonlinearity of the magnetic permeability." The new shape of core—with the help of some secondary effects—and the disposition and connection of windings allows a maximum utilization of the non-linearity characteristics of iron, without bringing it to saturation, and obtains high treble frequency voltage as a result of the sum of an unsymmetrical system in an open secondary winding.

Better to explain the functioning of the device, I shall begin by the more complex scheme, which is simpler to interpret.

It is the device employing two sets of three-phase cores in "open star-delta" feed scheme as shown in Fig. 9.

If we control, by the oscillographic method, fundamental elements in this case, we find that the magnetizing current is perfectly sinusoidal. Now, if we control voltage waves, total input voltage, and component voltages of the star and delta connected sets, we find that the total input voltage (net-work voltage) is sinusoidal: but 5° harmonic modulation appears, in complementary measure, on the star and delta polarities of the primary circuit. (Delta polarities must be measured against neutral feed point.)

A compensation between non-linearity effects on the two three-phase sets, 30° displacement, allows the sinusoidal magnetizing current to flow in all primary circuits.

The compensation occurs in every induction value: starting from zero up to normal induction values.

But it is well known that, if the magnetizing current is sinusoidal through a coil, the flux is distorted itno a flat-top wave, and an induced voltage wave is peaked: so, the effect obtained in the saturation type employing very high current and induction values, is now available at low levels.

If the single-phase cores have no joints (and windings are interwoven) I can obtain 50% of third harmonic component under 1,000 lines: the same value requires 2 Weber/m.$^2$ in saturable core type.

*Definition of the shape of core*

For pointing out the shape of the core, Fig. 7 is sufficient. The particular core is characterized by the linkage, as in a chain, of a number, preferably odd, of single-phase cores and a like number of primary coils: in the case in point, the linkage is a chain of three single-phase cores with three primary coils. Consequently:

(a) Each single-phase core is magnetized by two primary phases, of which one is inverted (displacement 60°).

(b) Each primary coil is linked with two cores, that is with two flux waves, 60° out of phase.

(c) The secondary winding, for every primary phase, presents two windings, in series, but turning in opposite direction. Secondary amperes-turns, in third harmonic frequency, are half concurrent, half opposite to primary ampere-turns.

The efficiency of the core can be improved by:

1. A continuous steel sheet along each single-phase sheet;

2. A three core magnetic connection common to all.

The secondary effects of that above will be explained hereafter.

*Efficiency of frequency transformer*

To limit the weight of the cores, harmonic saturation has been employed in my invention. But efficiency is already much higher than in saturation types.

In tests, a 1.5 kw. unit embodying my invention, only 13 kg. weight, using normal 1.2 watt/kg. sheet, 0.35 mm. thickness, and still jointed cores, has secured 85% efficiency: tests on better quality sheets and without joints bring up efficiency to 90%.

*Oscillographic tests on current, voltage and flux waves*

The above-mentioned explanation can be clarified by direct examination of current and voltage waves, and indirect flux wave calculation, by the oscillographic method. Here is the explanation of Figs. 13*a*, *b* and *c* and Figs. 14*a*, *b* and *c*.

*Figs. 13a, b and c—two three-phase sets in "open-star-delta" scheme*

They show:

Fig. 13*a*—total input voltage on primary circuits: sinusoidal wave V magnetizing current; sinusoidal wave I; component voltage on open star set $V_s$; component voltage on delta set, $V_A$; both 5° harmonic modulated wave.

Fig. 13*b*—flux waves $\phi_A$, $\phi_B$, $\phi_C$ on the single-phase cores A, B, C.

The flux wave is distorted in a flat-top wave: but the core is not saturated.

$V_A''$ is secondary induced voltage in a single-phase core.

Figure 13C:
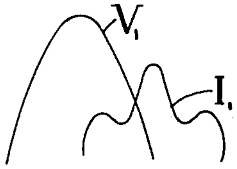

Fig. 13*c*—$\phi_A$–$\phi_C$ composition gives flux wave $\phi_1$, linked with a primary coil; $V_1$ is the corresponding voltage, 5° harmonic modulated.

*Figs. 14a, b and c—one three-phase set star primary connected*

One set (Fig. 8) can be utilized to obtain single-phase treble frequency voltage.

Magnetizing current is not sinusoidal: 5° harmonic modulation is intense.

Figs. 14*a*, *b* and *c* show:

Fig. 14*a*—voltage input wave $V_1$, sinusoidal magnetizing current $I_1$, 5° harmonic modulated.

Figure 14C:
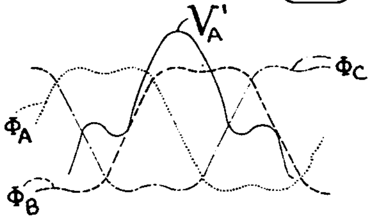
Figure 14B:
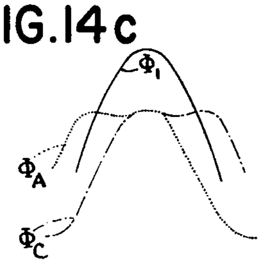

Fig. 14*b*—$\phi_A$, $\phi_B$, $\phi_C$ flux waves of the three single-phase cores A, B and C.

Corresponding induced voltage wave on a secondary coil $V_A{}^1$; composition of three secondary induced voltages is obviously a treble frequency voltage.

Fig. 14*c*—composition of $\phi_A$–$\phi_C$ flux waves gives sinusoidal wave $\phi_1$.

Characteristic property of the distorted flux wave in this case gives rise to a sinusoidal resulting wave as the difference.

Looking at the three-phase flux wave system, in Fig. 14*b* we must consider the "sequence" of two "key" instantaneous positions, 30° displaced in phase:

1. One flux is nul; the other two are equal at the max. in value, but opposed in direction; if a difference is made, they become concurrent. This is max. flux condition in a primary coil; zero condition for differential flux.

2. One flux is of medium value; the other two are of equal value and opposed to the former; but they are much more than half the value of the first. Here we have differential max. flux on the secondary winding.

Modulation in 5° harmonic is known in three-phase symmetrical coupled core; the origin must be common to the new special shape of three single-phase cores in one set; modulation appears 5° harmonic, but displacement in modulation is 30° as a consequence of above aforesaid "sequence."

*Geometrical details about the shape of cores, improving non-linearity effects*

The non-linearity of magnetic permeability is, as stated, the basic principle: but details on the geometrical shape of cores can improve notably the resulting differential flux.

As two primary coils are linked—in disinct places—with every single-phase core, the mutual induction coefficient between primary and secondary winding must vary: here we have a secondary non-linearity cause of geometrical origin. If magnetizing current is sinusoidal, turns number of the magnetmotive resulting force vary. This new non-linearity cause is opposite to normal non-linearity of magnetic permeability; to reduce its effect (deterrent to my purpose) the normal joints in the single-phase core can be reduced. A continuous steel sheet along each single-phase core allows best leakage although it entails some manufacturing and maintenance problems.

For the same reason, a theoretical nul condition, for flux in each single-phase core, according 60° displacement, derives by the opposition of two magnetomotive forces, at 0.5 of max. current. But as the permeability of air is not nul, every half-core will be magnetized partially by closure of the circuit in the air. This effect is favorable to my purpose; its importance can be increased by placing a magnetic connection between the three single phase cores forming a set; the air portion of the total circuit will in this case be reduced to half.

What I claim is:

1. A frequency transformer which functions as the result of the variability of reluctance of magnetic circuits in a closed chain of cores and exciting coils alternatively linked, said transformer comprising a group of KC single-phase cores, where K is an integral odd number greater than 1 and C is an integral number, each core including two magnetic legs and magnetic means joining the ends of said legs, the cores being arranged in a closed ring with a leg of each core juxtaposed to a leg of an adjacent core, a secondary winding around each individual leg, and a primary winding around each pair of juxtaposed legs whereby there are half as many primary windings as secondary windings.

2. A frequency transformer as set forth in claim 1 wherein the secondary windings on each pair of juxtaposed legs are wound in opposite senses.

3. A frequency transformer as set forth in claim 1 wherein the secondary windings on each pair of juxtaposed legs are wound in opposite senses, and wherein the secondary windings of each pair of juxtaposed legs are inside the primary windings for said pair of legs.

4. A frequency transformer as set forth in claim 1 wherein the primary windings are star connected.

5. A frequency transformer as set forth in claim 1 wherein the primary windings are star connected and the secondary windings are series connected.

6. A frequency transformer as set forth in claim 1 wherein capacitors are included in the secondary circuit to maintain rephasing of the secondary current at the changed frequency.

7. An apparatus for the transformation of an odd-numbered polyphase system into an even-numbered polyphase system of multiple frequency, said apparatus including a pair of transformers as set forth in claim 1, the primary windings in one transformer being connected in a closed series, the primary windings in the other transformer being connected in open star to the primary windings of the first transformer, the secondary windings in each transformer being connected in an open series.

8. An apparatus for the transformation of a three-phase system having a frequency $n$ into a four-phase system having a frequency $3n$, said apparatus including a pair of transformers as set forth in claim 1 wherein the primary windings in one transformer are delta connected and the primary windings in the other transformer are connected in open star to the primary windings of the first transformer, the secondary windings in each transformer being connected in an open delta.

9. An apparatus for the transformation of an odd-numbered polyphase system into an even-numbered polyphase system of multiple frequency, said apparatus including a pair of transformers as set forth in claim 1, the primary windings in one transformer being connected in a closed series, the primary windings in the other transformer being connected in open star to the primary windings of the first transformer, the secondary windings in each transformer being connected in an open series, and capacitors in the secondary circuits to maintain rephasing of the secondary current at the changed frequency.

10. An apparatus for the transformation of a three-phase system having a frequency $n$ into a four-phase system having a frequency $3n$, said apparatus including a pair of transformers as set forth in claim 1 wherein the primary windings in one transformer are delta connected and the primary windings in the other transformer are connected in open star to the primary windings of the first transformer, the secondary windings in each transformer being connected in an open delta, and capacitors in the secondary circuits to maintain rephasing of the secondary current at the changed frequency.

UGO CORBINO.

REFERENCES CITED

The following references are of record in the file of this patent:

UNITED STATES PATENTS

| Number | Name | Date |
|---|---|---|
| 1,157,730 | Spinelli | Oct. 26, 1915 |
| 2,324,634 | McCreary | July 20, 1943 |
| 2,418,643 | Huge | Apr. 8, 1947 |
| 2,424,237 | Huge | July 22, 1947 |
| 2,437,093 | Huge | Mar. 2, 1948 |
| 2,445,857 | McCreary | July 27, 1948 |
| 2,517,396 | Logan | Aug. 1, 1950 |